Figure 1:
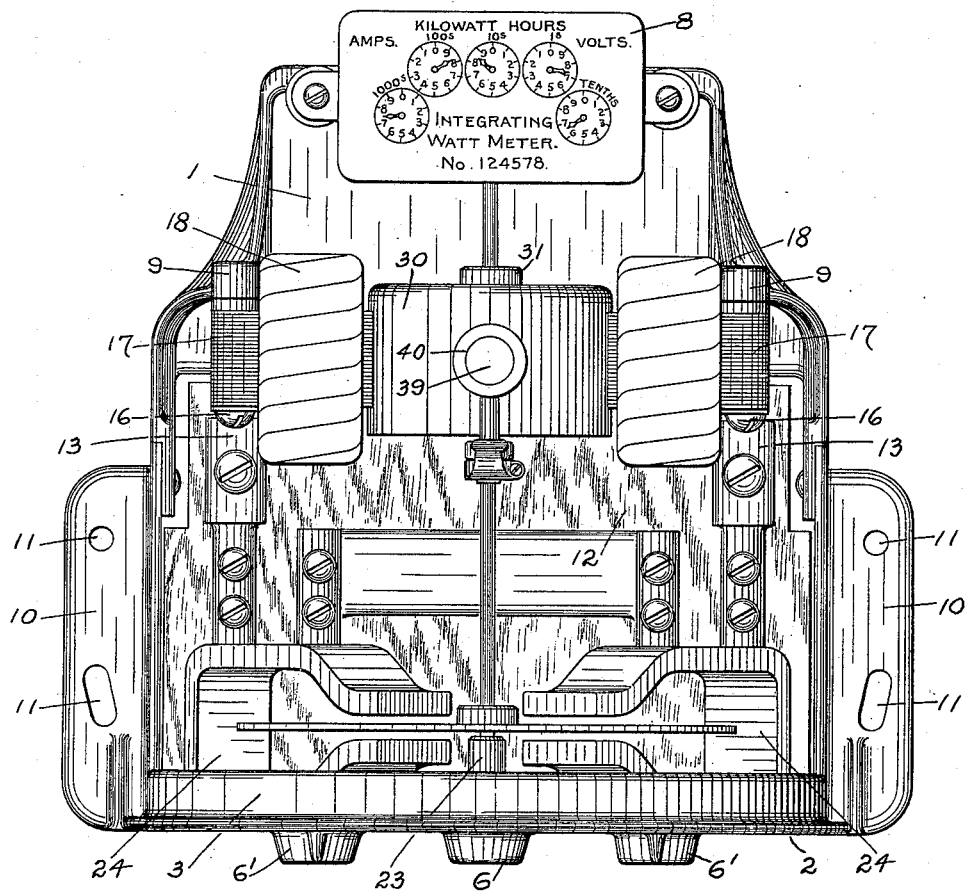

(No Model.)

7 Sheets—Sheet 1.

T. DUNCAN.
ELECTRIC METER.

No. 604,466.

Patented May 24, 1898.

Witnesses
Samuel A. Bachtel
Adelaide Kearns

Thomas Duncan Inventor
By his Attorneys Chapin & Denny (No Model.)

T. DUNCAN.
ELECTRIC METER.

No. 604,466.

7 Sheets—Sheet 2.

Patented May 24, 1898.

Witnesses
Samuel R. Bachtel.
Adelaide Keames.

Thomas Duncan Inventor
By his Attorneys Chapin & Denny (No Model.)

7 Sheets—Sheet 3.

T. DUNCAN.
ELECTRIC METER.

No. 604,466.

Patented May 24, 1898.

Witnesses
Samuel R. Bachtel
Adelaide Kearns

Thomas Duncan Inventor
By his Attorneys Chapin & Denny (No Model.) 7 Sheets—Sheet 4.

T. DUNCAN.
ELECTRIC METER.

No. 604,466. Patented May 24, 1898.

Witnesses
Samuel R. Bachtel
Adelaide Kearns

Inventor
Thomas Duncan
By his Attorneys
Chapin & Denny (No Model.) 7 Sheets—Sheet 5.

T. DUNCAN.
ELECTRIC METER.

No. 604,466. Patented May 24, 1898.

Witnesses
Samuel R. Bachtel
Adelaide Kearns

Thomas Duncan Inventor
By his Attorneys Chapin & Denny (No Model.)  7 Sheets—Sheet 6.

T. DUNCAN.
ELECTRIC METER.

No. 604,466.  Patented May 24, 1898.

Witnesses
Samuel A. Bachtel
Adelaide Kearns

Thomas Duncan Inventor
By his Attorneys Chapin & Denny

THE NORRIS PETERS CO., PHOTO-LITHO., WASHINGTON, D. C.

(No Model.) 7 Sheets—Sheet 7.

T. DUNCAN.
ELECTRIC METER.

No. 604,466. Patented May 24, 1898.

Witnesses
Samuel R. Bachtel.
Adelaide Kearns.

Thomas Duncan Inventor
By his Attorneys Chapin & Denny

UNITED STATES PATENT OFFICE.

THOMAS DUNCAN, OF FORT WAYNE, INDIANA.

ELECTRIC METER.

SPECIFICATION forming part of Letters Patent No. 604,466, dated May 24, 1898.

Application filed November 8, 1897. Serial No. 657,730. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in integrating wattmeters for measuring alternating electric currents, and particularly to that class known as "motor-meters."

The objects of my invention are to provide a meter that is sensitive and efficient upon small loads, adapted for a convenient adjustment for neutralizing the friction of its bearings when in operation, capable of measuring accurately large capacities and yet adapted to measure on less than one-half of one per centum of its total capacity, and that will measure inductive loads.

Another object is to provide a compensating device for balancing the friction and inertia so constructed and arranged as to be adjustable to suit the pressure at the point of utility.

The novel feature of my invention consists in the construction, arrangement, and combination of the series coils, the laminated core therefor, the aluminium armature, the shunt or volt coil, the compensating device, and the magneto-electric drag.

Figure 2:
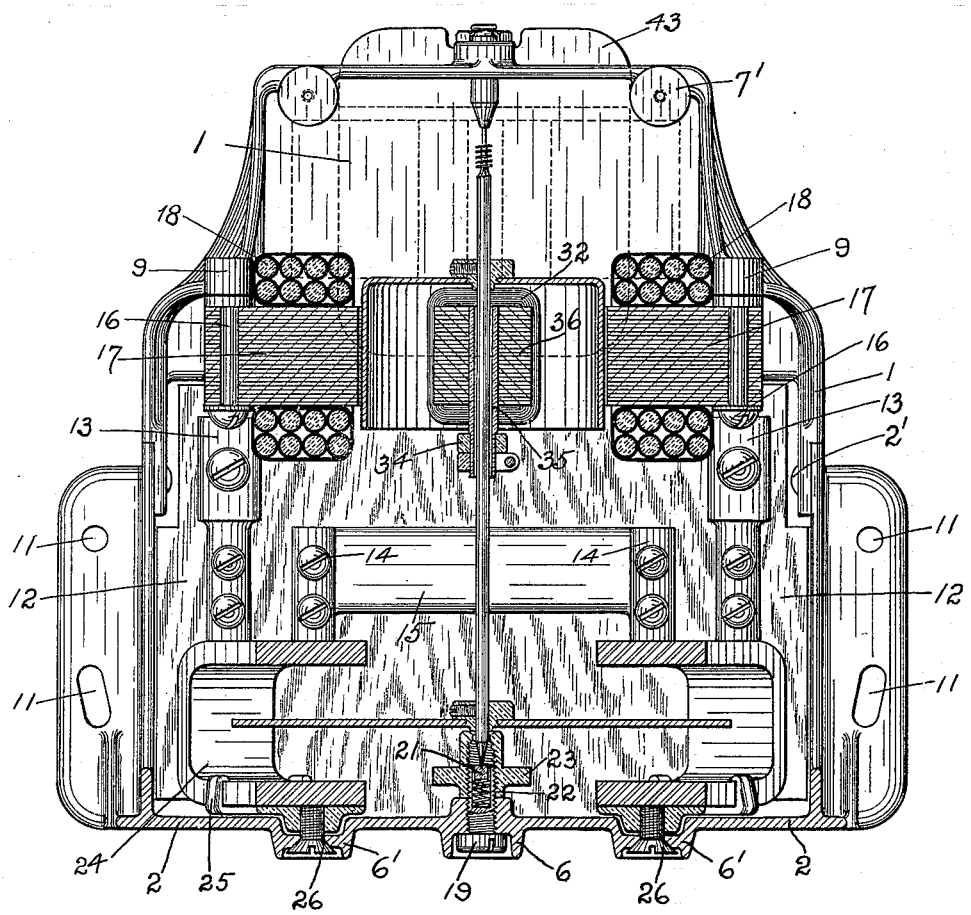
Figure 3:
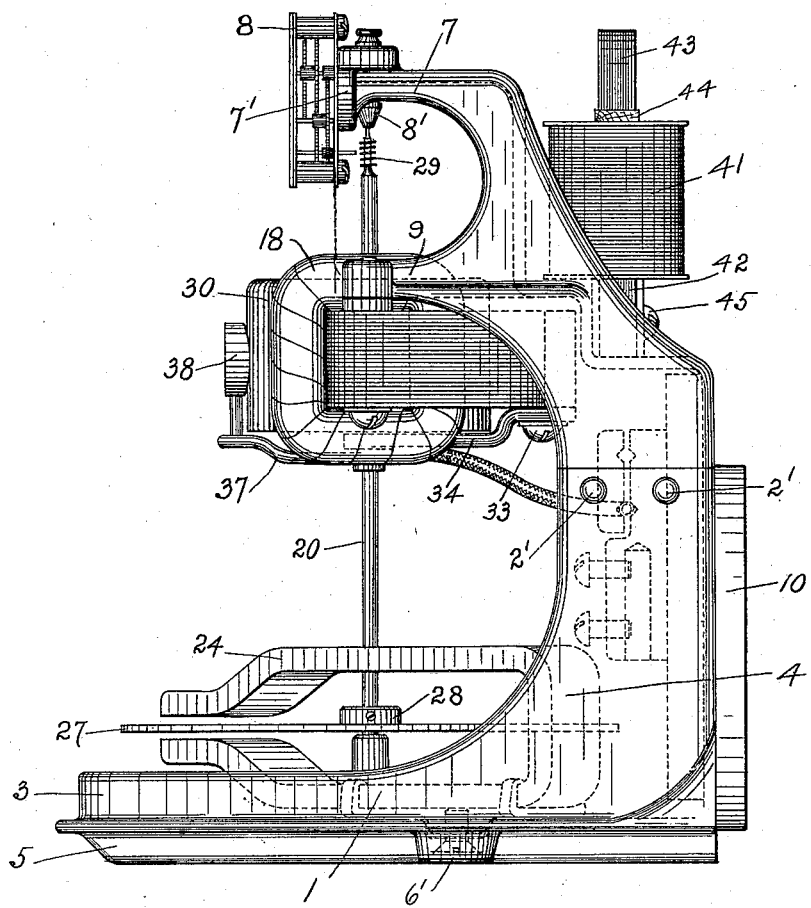
Figure 4:
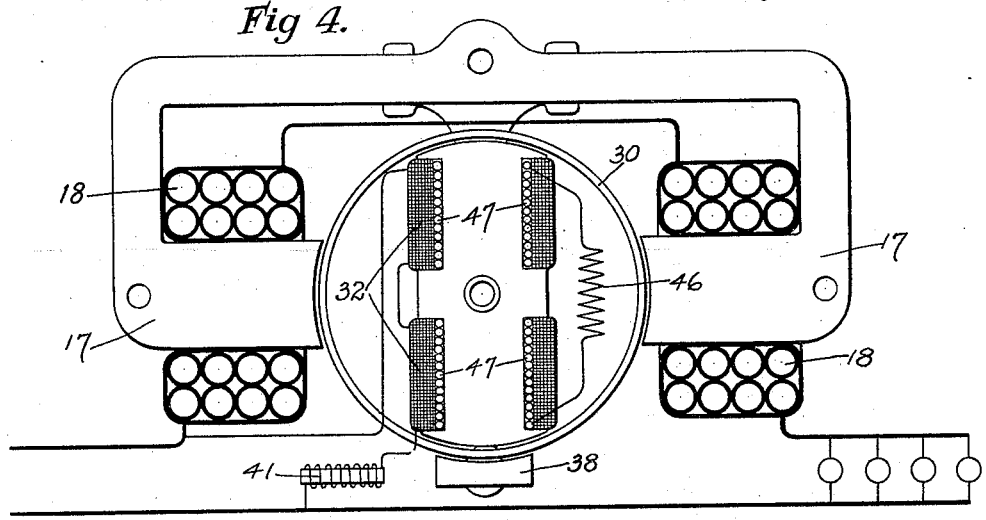
Figure 5:
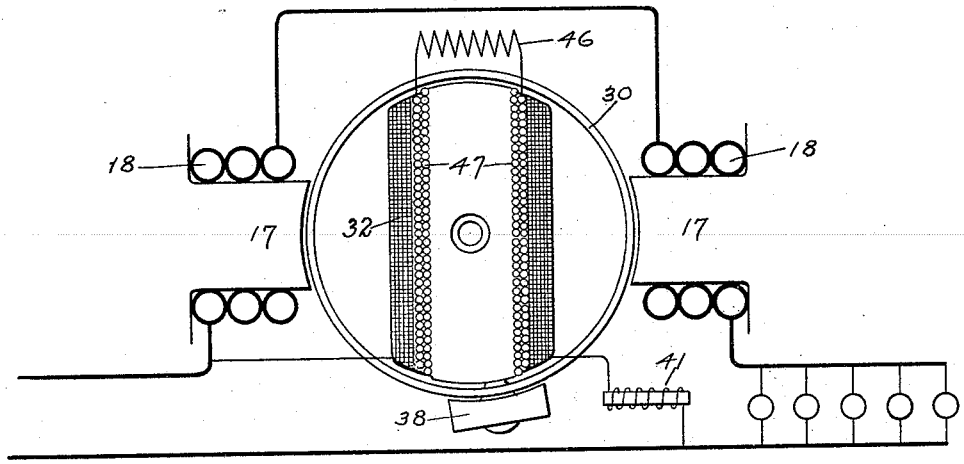
Figure 6:
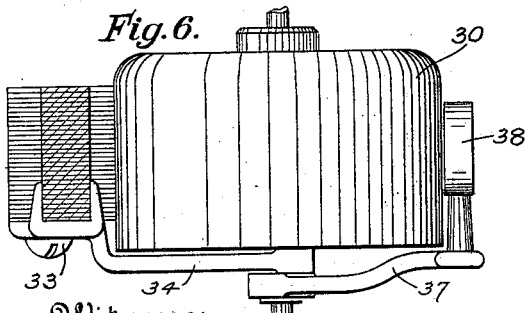
Figure 7:
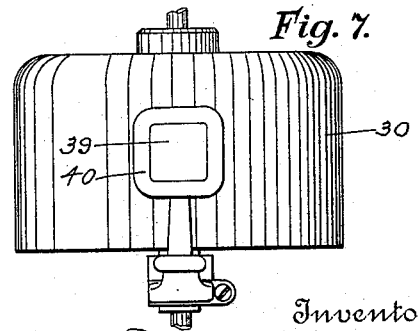
Figure 8:
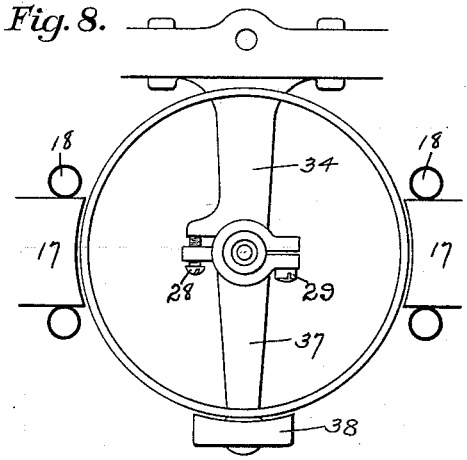
Figure 9:
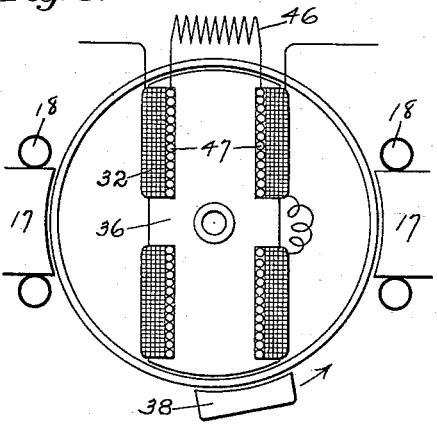
Figure 10:
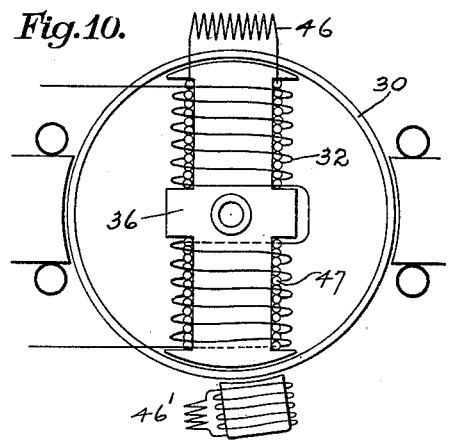
Figure 11:
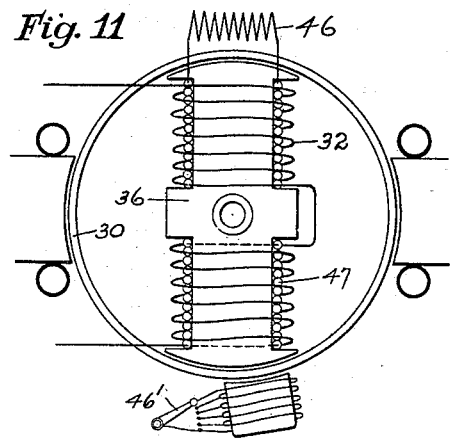
Figure 12:
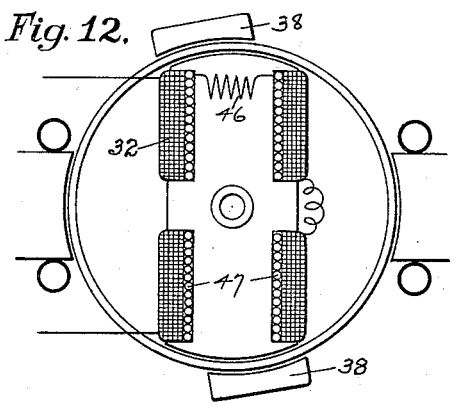
Figure 13:
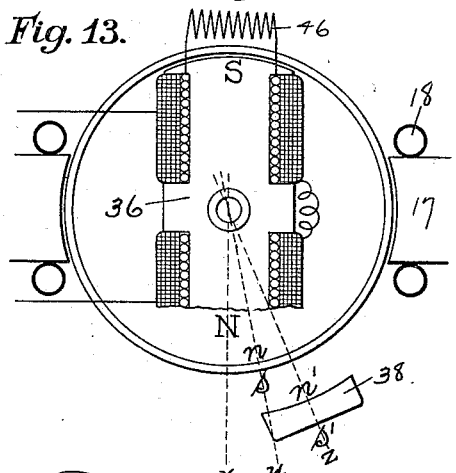
Figure 14:
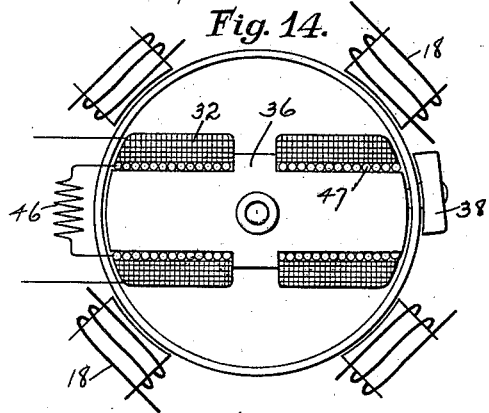
Figure 15:
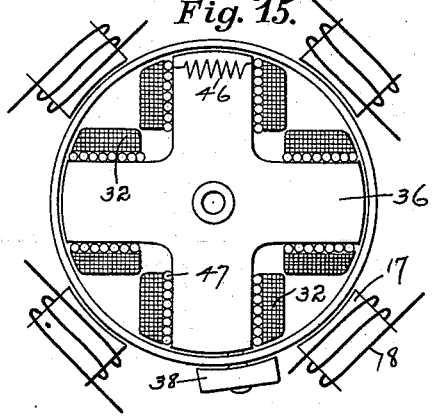
Figure 16:
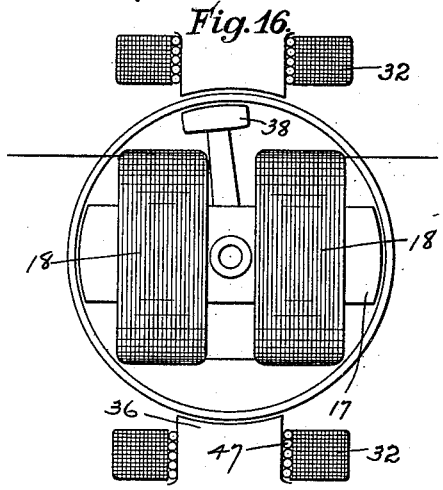
Figure 17:
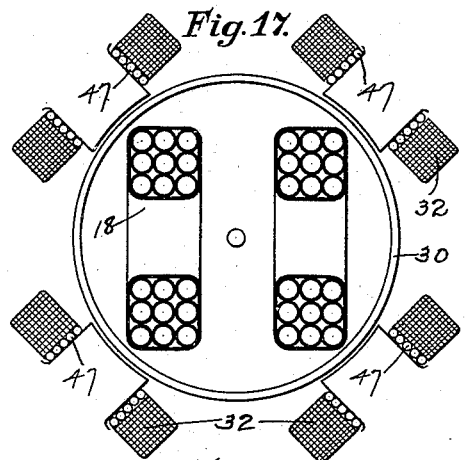
Figure 18:
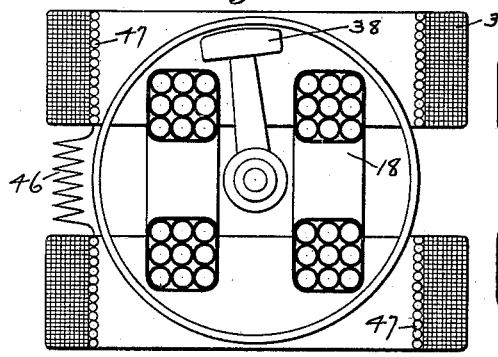
Figure 19:
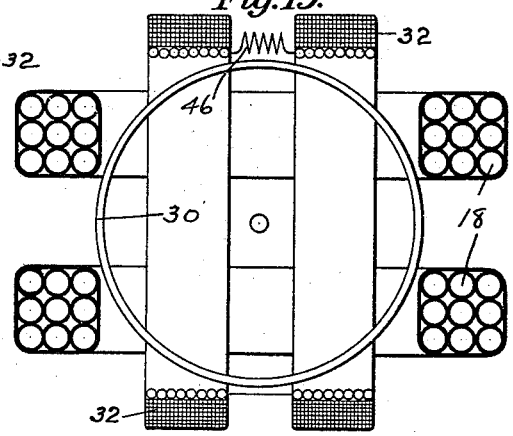
Figure 20:
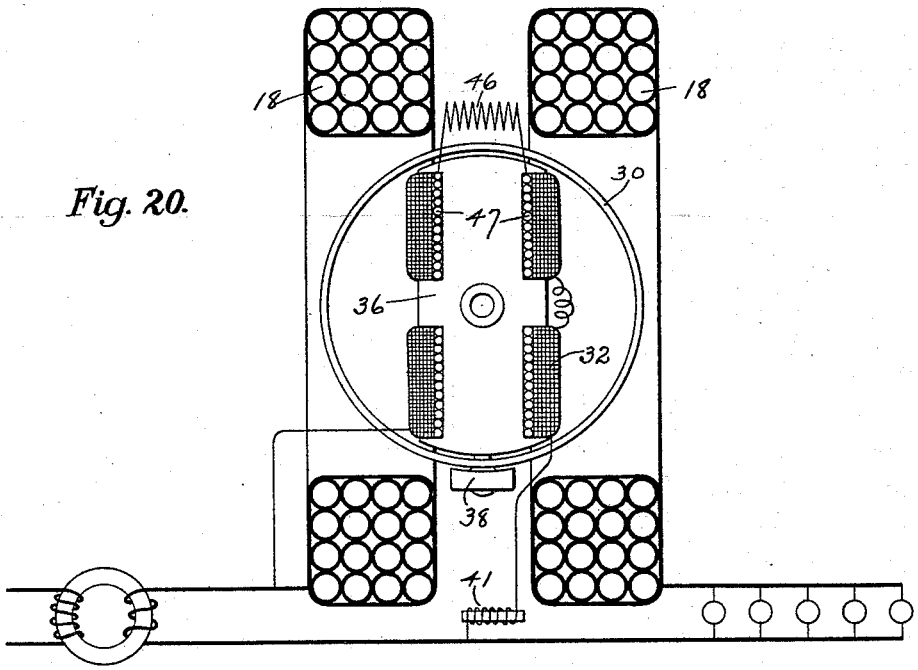
Figure 21:
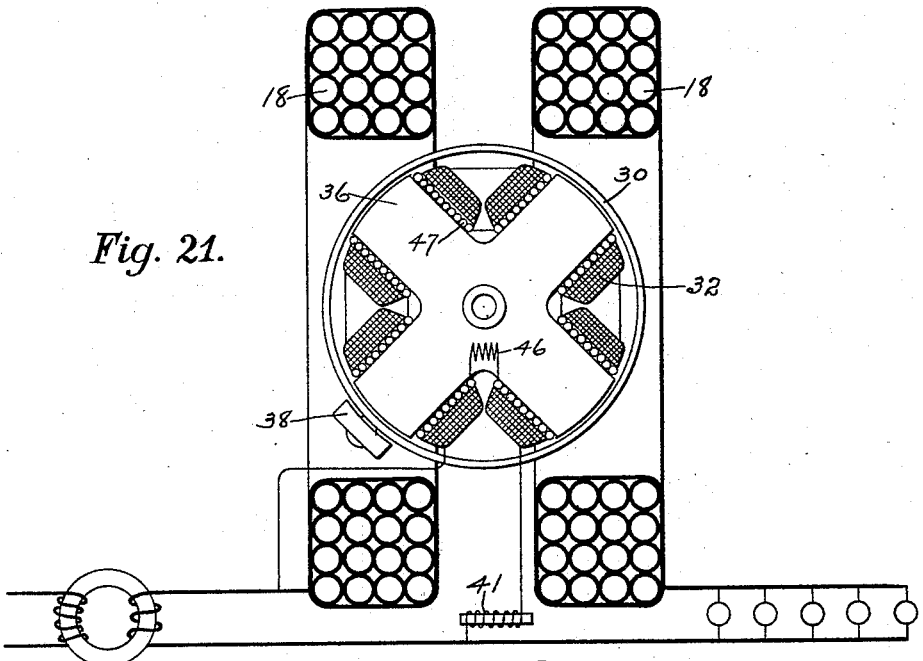

In the accompanying drawings, in which similar reference numerals and letters indicate like parts throughout the several views, Figure 1 is a front elevation of my invention, showing the general arrangement of the parts thereof. Fig. 2 is a similar view of the same, with the operative parts shown in vertical section. Fig. 3 is a side elevation of the same. Figs. 4 and 5 are sectional views taken horizontally through the motive part. Fig. 5 also shows the compensating device adjusted to one side to counterbalance the friction of the moving parts of the meter. Figs. 6 and 7 are details of the revoluble armature, with the compensating device mounted in position adjacent thereto. Fig. 8 shows the volt-coil and core removed to show the adjusting-screws 28 and 29. Fig. 9 shows the compensator moved to the left to assist in producing rotation of the cylindrical armature. Fig. 10 shows the compensating device wound with a wire and in series with a proper resistance by the variation of which the desired starting torque may be obtained. Fig. 11 shows the said resistance employed with variable contacts, such as are used in ordinary rheostats. Fig. 12 shows the employment of two compensating devices in diametric arrangement outside of the cylinder. Fig. 13 illustrates diagrammatically the action of the compensating device upon the armature in producing or accelerating rotation thereof. Fig. 14 shows a diametric core arranged in combination with a multipolar series field. Fig. 15 shows the employment of a four-pole field and four-pole volt-coil. Fig. 16 shows an arrangement of series coils upon the inside of the cylindrical armature and the volt-coils upon the outside thereof. Fig. 17 shows a similar arrangement of the series coils inside of the armature and the multipolar volt-coils outside thereof. Fig. 18 differs from Fig. 17 in having the shunt-coil embracing the armature. Fig. 19 shows both the series and volt coils mounted without the armature. Figs. 20 and 21 show the series coils without the use of an iron core and with two and four pole volt-coils, respectively.

The operative parts of my invention are mounted within and upon the two-part cast metallic sheath 1, having a forwardly-projecting base 2, semicircular in contour and provided with an upright flange 3, which is a continuation of the opposite integral sides 4. The meeting edges of said sheath-sections are rigidly secured by proper holding-screws 2' or other proper manner.

On the lower face of the base 2 are arranged the strengthening-flanges 5 and the sealing-pockets 6. The sides 4 at their upper ends have the forwardly-projecting flange 7, having the apertured lugs 7', to which is detachably fixed a proper registering-train 8, and also have near their upper portions the integral forwardly-extended arms 9 to support the core of the series coils. The sheath 1 is also provided near its base with the lateral upright flanges 10, having suitable perforations 11, by which the said sheath is rigidly secured in position upon a proper support. In a suitable vertical opening in said flange 7 midway its ends and near its outer edge is arranged a bearing 8' for the upper end of the armature-spindle, Figs. 2 and 3. In the lower portion of said sheath and adjacent to the back thereof is properly secured an upright insulating-board 12. To the outer face of said board 12 and near the opposite sides thereof are fixed the outer binding-posts 13 and the inner binding-posts 14, which are connected by the cross-bar 15. To the free end and lower face of the said arms 9 are rigidly secured by means of the screws 16 the ends of the laminated core 17, Figs. 2 and 4. On the adjacent ends of said core are mounted the series coils 18. In a central screw-threaded opening in the base of said sheath is mounted the screw 19, whose upper end is centrally apertured for the conical lower end of the armature-spindle 20, and has a proper jewel-bearing 21 arranged in a horizontal central slot therein and supported upon a suitable spiral spring 22, adapted to take the jar off of the said jewel in handling or in transportation. In this jewel 21 is mounted the lower conical end of the armature-spindle. A thumb-nut 23, Fig. 2, having its upper end centrally apertured to admit the lower end of said spindle, is arranged upon the upper portion of said screw 19. The head of said screw 19 is contained in the pendent pocket 6, in which, after adjustment, it is securely sealed. On the base 2 of said sheath 1 are arranged the permanent magnets 24, which are mounted in the respective clamps 25. These clamps are rigidly secured in position by the holding-screws 26, the heads of which are arranged in the pockets 6', and when adjusted are properly sealed therein. An aluminium disk 27, adapted for rotation between the poles of the said permanent magnets to make the speed of the meter proportional to the energy passing through the same in a well-understood manner, is mounted upon said armature-spindle adjacent to the upper end of said thumb-nut and is secured in position by a proper set-screw. The central hub 28 of said disk has a pendent annular lug concentric with the spindle, whereby by elevating said thumb-nut to contact with the pendent portion of said hub and then rotating the same the armature-spindle will be elevated out of contact with said jewel-bearing, which is desirable in transportation. The armature-spindle has upon its upper end a proper worm 29, adapted to form an actuating engagement with the said registering-train. The cylindrical armature 30, preferably of aluminium, has a closed top provided with a concentric hub 31. This armature is rigidly fixed to said spindle 20 by a proper set-screw in said hub and is arranged between the ends of said core 17 and in close proximity thereto. Within the armature is arranged a volt-coil 32, rigidly supported therein as follows: To the rear portion of the field-core 17 and in the rear of the armature is rigidly fixed, by means of the holding-screw 33, the forwardly-projecting arm 34, whose end has a vertical opening, in which is soldered the lower end of the upright tube 35, Fig. 2, which is loosely mounted on the spindle 20. On this tube is rigidly fixed in any proper manner the laminated iron core 36, upon which the volt-coil 32 is wound. To the lower end of said tube 35 is clamped or otherwise mounted the forwardly-projecting arm 37, on the forward end of which is mounted the compensating device 38, which is arranged immediately adjacent and in close proximity to the front face of said armature. As the arm 37 is pivotally mounted on said tube, the compensating device 38 is adapted for a lateral adjustment to any desired position in front of the armature. This compensating device is formed of an iron core 39 and a closed circuit or secondary 40, the secondary being preferably a piece of copper tubing.

To the back of the sheath 1, near the top thereof, is arranged an impedance-coil 41, having an iron core 42 and an adjustable part 43, which is separated from the said coil and said core by a wooden piece 44. The impedance-coil thus arranged is supported in position by a proper holding-screw 45, Fig. 3. Another coil 47, of less turns than those of the said volt-coil and of larger wire, is wound upon the said iron core 36, and has a resistance 46 in series with it, as shown diagrammatically in Figs. 4 and 5. The two remaining or outer terminals of the impedance-coil and volt-coil are connected to the two leads of the system, as shown in Fig. 4.

The operation of the improved meter is, briefly stated, as follows: When an impulse of current traverses the series coils 18, Fig. 4, a line of magnetism is set up in the horizontal. Another impulse of current also traverses the volt-coil 32; but because of its own self-induction and that of the impedance-coil in series with it its current lags behind that in the series coils, thereby setting up at right angles or the vertical, another line of magnetization lagging behind the said line of magnetization set up by the series coils. These two lines of magnetization form a resultant which actuates the cylindrical armature in a well-understood manner. The torque thus produced will vary as the energy through the meter; but a load or drag must be applied, so that the speed will also vary as the torque or energy. This function is accomplished by the said aluminium disk 27, rotating between the poles of the permanent magnets 24 in a well-understood manner.

When it is desired to measure inductive loads with my improved meter, it is necessary that the magnetism of the volt-coil 36 should be exactly in quadrature with the electromotive force of the circuit. This is accomplished by the employment of the said secondary coil or winding 47, which is short-circuited through a resistance 46. Assuming that the current through the volt-coil circuit lags less than ninety degrees behind the electromotive force, the resistance 46 may be adjusted until the current in the secondary 47, acting in conjunction with that in the volt-coils 32, forms a resultant field through the iron core 36, which acts upon the cylindrical armature, and is in quadrature to the electromotive force. The secondary coil 47 may have more than one layer, as shown in Fig. 5.

The compensating device may be square in form instead of circular, as shown in Fig. 7. When the said compensating device is equidistant from the oppositely-arranged field-coils, as in Fig. 8, it has no tendency to produce motion in the adjacent armature. By adjusting the said compensator to the side in which rotation is desired or that in which the meter normally rotates the motion of the armature is accelerated, depending upon the adjustment of said compensator.

In practice the compensator is adjusted just far enough to counterbalance or neutralize the friction and inertia of the moving parts of the meter, after which the meter will operate or start up on a very small amount of energy.

When a meter is adjusted for simply overcoming the friction of its working parts in a laboratory, where there is no perceptible vibration and is then placed or installed in a location where it is subjected to vibration, it will run fast or "creep," because such vibration tends to overcome the friction of its working parts. Therefore the meter will operate more or less when no energy is being used by the consumer. In my present improved meter this difficulty is entirely overcome by the use of the said compensating device, for by its use "creeping" is prevented, and each meter can be adjusted to meet the conditions of its situation or environment without in the least interfering with the torque on any load.

As shown in Fig. 10, the compensator may be set at the maximum angle, which is about thirty to forty degrees, when by varying the resistance 46' the desired starting torque may be obtained. A pair of compensators arranged diametrically of said armature is shown in Fig. 12. The action of the said compensator is illustrated diagrammatically in Fig. 13. Assume that the magnetism through the core 36 produces the poles N and S at any given instant, and in the absence of the compensator 38 said magnetism, we will assume, would tend to follow the line $x$; but on account of said compensator the magnetism will be diverted or drawn in the direction of the line $y$ through the cylindrical armature, thereby inducing in said armature eddy-currents, which will give the poles $n$ and $s$. After the magnetism has passed through the armature it will enter the compensator, as shown by the line $z$, being drawn by the iron core 39, Figs. 10 and 11, thereby also inducing currents in the closed circuit which gives the poles $n'$ $s'$. From the above conditions we have the pole N of the core 36 repelling the pole $n$ of the revoluble armature and $n'$ of the compensator attracting $s$ of the armature. The poles $n$ and $n'$ are opposite or facing N on account of the lag and self-induction of the eddy-currents producing them.

Practical tests have demonstrated that my present compensator is far more powerful and efficient than the compensator shown and described in a prior patent granted to me on the 15th day of December, 1896, numbered 573,078 and consisting of an iron pin.

Having thus described my invention and the manner of operating the same, what I desire to secure by Letters Patent is—

1. In an electric-motor meter the combination of a series field representing the main current; a revoluble armature in inductive relation to said field; a volt coil or coils arranged in inductive relation to said armature; a secondary coil closed through a suitable resistance and acting inductively in coöperation with the said volt coil or coils upon the said armature; and a compensating device comprising an iron core 39 and a closed circuit or secondary 40, the said compensator being adapted for adjustment relative to said armature for the purpose specified, substantially as described.

2. In an electric-motor meter, a compensating device 38 comprising an iron core 39 and a secondary 40, and means for adjusting the same, the said device being adapted for an angular adjustment relative to the armature, and is adapted to neutralize the friction and inertia of the moving parts of the meter, all substantially as described.

3. In a motor-meter, the combination of a series field traversed by the main current; a revoluble armature in inductive relation to said field; and an adjustable compensating device 38 adapted to counterbalance or neutralize the friction and inertia of the moving parts of the meter, and comprising an iron core fixed upon a pivoted supporting-arm and a secondary 40 in coöperative relation with said armature.

Signed by me, at Fort Wayne, Allen county, State of Indiana, this 5th day of November, A. D. 1897.

THOMAS DUNCAN.

Witnesses:
ADELAIDE KEARNS,
WATTS P. DENNY.